(12) United States Patent
Fleckner et al.

(10) Patent No.: US 8,240,413 B2
(45) Date of Patent: Aug. 14, 2012

(54) METHOD AND DEVICE FOR CONTROLLING A HYBRID VEHICLE

(75) Inventors: Marco Fleckner, Leonberg (DE); Markus Göhring, Nufringen (DE); Dieter Kraxner, Wurmberg (DE); Nils Sauvlet, Bad Essen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 884 days.

(21) Appl. No.: 11/829,998

(22) Filed: Jul. 30, 2007

(65) Prior Publication Data
US 2008/0029319 A1 Feb. 7, 2008

(30) Foreign Application Priority Data

Jul. 28, 2006 (DE) .................. 10 2006 034 932

(51) Int. Cl.
*B60W 10/08* (2006.01)
(52) U.S. Cl. ............ 180/65.285; 180/65.21; 180/65.275
(58) Field of Classification Search ............... 180/65.21, 180/65.22, 65.225, 65.25, 65.26, 65.285
See application file for complete search history.

(56) References Cited

U.S. PATENT DOCUMENTS

| | | | | |
|---|---|---|---|---|
| 4,533,011 A * | 8/1985 | Heidemeyer et al. | ...... | 180/65.25 |
| 5,927,415 A * | 7/1999 | Ibaraki et al. | ............. | 180/65.25 |
| 6,334,498 B1 * | 1/2002 | Morisawa et al. | ......... | 180/65.25 |
| 6,364,434 B1 * | 4/2002 | Sway-Tin et al. | ............. | 303/152 |
| 6,378,636 B1 * | 4/2002 | Worrel | ........................ | 180/65.25 |
| 6,459,980 B1 * | 10/2002 | Tabata et al. | ..................... | 701/70 |
| 7,672,770 B2 * | 3/2010 | Inoue et al. | ..................... | 701/70 |
| 2001/0011050 A1 * | 8/2001 | Yamaguchi et al. | .............. | 477/3 |
| 2001/0013438 A1 * | 8/2001 | Stenvall et al. | ............. | 180/65.4 |
| 2002/0035006 A1 * | 3/2002 | Suzuki et al. | ................. | 477/3 |
| 2004/0192494 A1 * | 9/2004 | Ozeki et al. | ....................... | 477/3 |
| 2006/0169503 A1 * | 8/2006 | Oliver et al. | ................. | 180/65.2 |

FOREIGN PATENT DOCUMENTS

DE 100 25 037 A1 11/2001
EP 1 531 073 A1 5/2005

* cited by examiner

*Primary Examiner* — J. Allen Shriver, II
*Assistant Examiner* — Travis Coolman
(74) *Attorney, Agent, or Firm* — Gerald E. Hespos; Michael J. Porco

(57) ABSTRACT

A method and a device control a hybrid vehicle drive. The device contains a multiplicity of control parameter sets having different recovery torques for a conversion control device which sets a recovery torque of the electric motor in an overrun phase, which recovery torques are assigned a respective driving mode indicator. A definition device is provided for defining a current driving mode indicator, as a result of which a control parameter set corresponding to the defined current driving mode indicator can be used to control the conversion control device in an overrun phase of the hybrid vehicle drive.

2 Claims, 2 Drawing Sheets

METHOD AND DEVICE FOR CONTROLLING A HYBRID VEHICLE

CROSS-REFERENCE TO RELATED APPLICATION

This application claims the priority, under 35 U.S.C. §119, of German application DE 10 2006 034 932.6, filed Jul. 28, 2006; the prior application is herewith incorporated by reference in its entirety.

BACKGROUND OF THE INVENTION

Field of the Invention

The present invention relates to a method and a device for controlling a hybrid vehicle drive.

For some years what are referred to as hybrid drives have been commercially available as an alternative, which is economical in terms of fuel consumption and less damaging to the environment, to a conventional internal combustion engine.

For the hybrid drive, the general definition has become established that it contains at least two different energy transducers and two different energy stores.

With a few exceptions, in terms of practical implementation the transducers are an internal combustion engine and an electric motor and the energy stores are a combustible fuel and a battery.

A hybrid drive has the advantage over conventional vehicles with an internal combustion engine that to a large extent it can recover the braking energy (with the exception of a decrease in efficiency). The recovered braking energy is stored in the battery of the electric motor, with the electric motor being operated as a generator and functioning as a mechanical/electrical transducer.

The buffering of the energy, that is to say the recovery, occurs during active braking and in the overrun mode. The overrun mode is a state of the vehicle in which the internal combustion engine is not actively driving the vehicle because the driver is not depressing the accelerator pedal. The vehicle is therefore in a passive state and is driven forward only by its own inertial mass until the various driving resistances gradually decelerate it to a stationary state. In hybrid vehicle drives, the petrol supply and ignition are switched off in the overrun phase and furthermore technical measures are taken to prevent the engine brake of the internal combustion engine in the overrun mode and thus allow the kinetic energy to be passed as completely as possible to the electric motor which is configured as a mechanical/electrical transducer. This can be done most simply by closing the valves completely and thus not allowing any more air to pass through the intake section and into the cylinders. There is then no pumping loss any more. Likewise, mechanical decoupling of the internal combustion engine by a corresponding clutch is also possible.

The dynamo effect of the electric motor which functions as a transducer generates a braking effect which, however, is significantly weaker than the conventional engine brake of the internal combustion engine. For this reason it has been suggested additionally to configure an engine brake of the internal combustion engine in such a way that it can be activated as a function of the position of the selector lever for the transmission range, which engine brake supports the braking effect of the electric motor when, for example, there is a severe negative gradient, thus relieving the foot brake. The degree of recovery is reduced in this case because here part of the braking effect is destroyed in the internal combustion engine and therefore is not provided to the electric motor for conversion.

The fact that, in certain operating situations, frequent switching on and off of the internal combustion engine in overrun phases and low-velocity travel phases can be observed, which has a disruptive effect and increases fuel consumption, has proven disadvantageous in the known hybrid vehicle drives.

SUMMARY OF THE INVENTION

It is accordingly an object of the invention to provide a method and a device for controlling a hybrid vehicle drive which overcomes the above-mentioned disadvantages of the prior art methods and devices of this general type.

With the foregoing and other objects in view there is provided, in accordance with the invention a method for controlling a hybrid vehicle drive with an internal combustion engine and an electric motor. The method includes the steps of specifying a multiplicity of control parameter sets with different recovery torques for a conversion control device for setting a recovery torque of the electric motor in an overrun phase; assigning a respective driving mode indicator to the multiplicity of control parameter sets; defining a current driving mode indicator; and using a respective control parameter set, corresponding to the current driving mode indicator, to control the conversion control device in the overrun phase of the hybrid vehicle drive.

The method according to the invention for controlling a hybrid vehicle drive and the corresponding device have the advantage that the recovery can be configured more flexibly and as a result fuel consumption advantages and/or an increase in driving comfort can be achieved.

The idea on which the present invention is based relates in that a control parameter set, corresponding to a defined current driving mode indicator, can be used to control the conversion control device in an overrun phase of the hybrid vehicle drive.

According to one preferred development, the driving mode indicator is defined manually.

According to a further preferred development, the current driving mode indicator is defined automatically.

According to a further preferred development, a first mode indicator is assigned to a first control parameter set in a sport mode with a first recovery torque, and a second driving mode indicator is assigned to a second control parameter set in a normal mode with a second recovery torque, and the first recovery torque is greater than the second recovery torque. As a result of this, the frequency of switching the internal combustion engine on and off can be reduced in the course of slow travel.

With the foregoing and other objects in view there is further provided, in accordance with the invention a device for controlling a hybrid vehicle drive with an internal combustion engine and an electric motor. The device contains a memory storing a multiplicity of control parameter sets with different recovery torques for a conversion control device for setting a recovery torque of the electric motor in an overrun phase. The recovery torques are assigned to a respective driving mode indicator. A definition device is provided for defining a current driving mode indicator, by which a control parameter set corresponding to the current driving mode indicator is used to control the conversion control device in an overrun phase of the hybrid vehicle drive.

In accordance with an added mode of the invention, the definition device has a switching device that can be operated manually.

In accordance with another mode of the invention, the definition device has a controllable switching device and an automatic driving mode definition device for generating a control signal for the controllable switching device on a basis of at least one driving mode parameter.

Other features which are considered as characteristic for the invention are set forth in the appended claims.

Although the invention is illustrated and described herein as embodied in a method and a device for controlling a hybrid vehicle drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
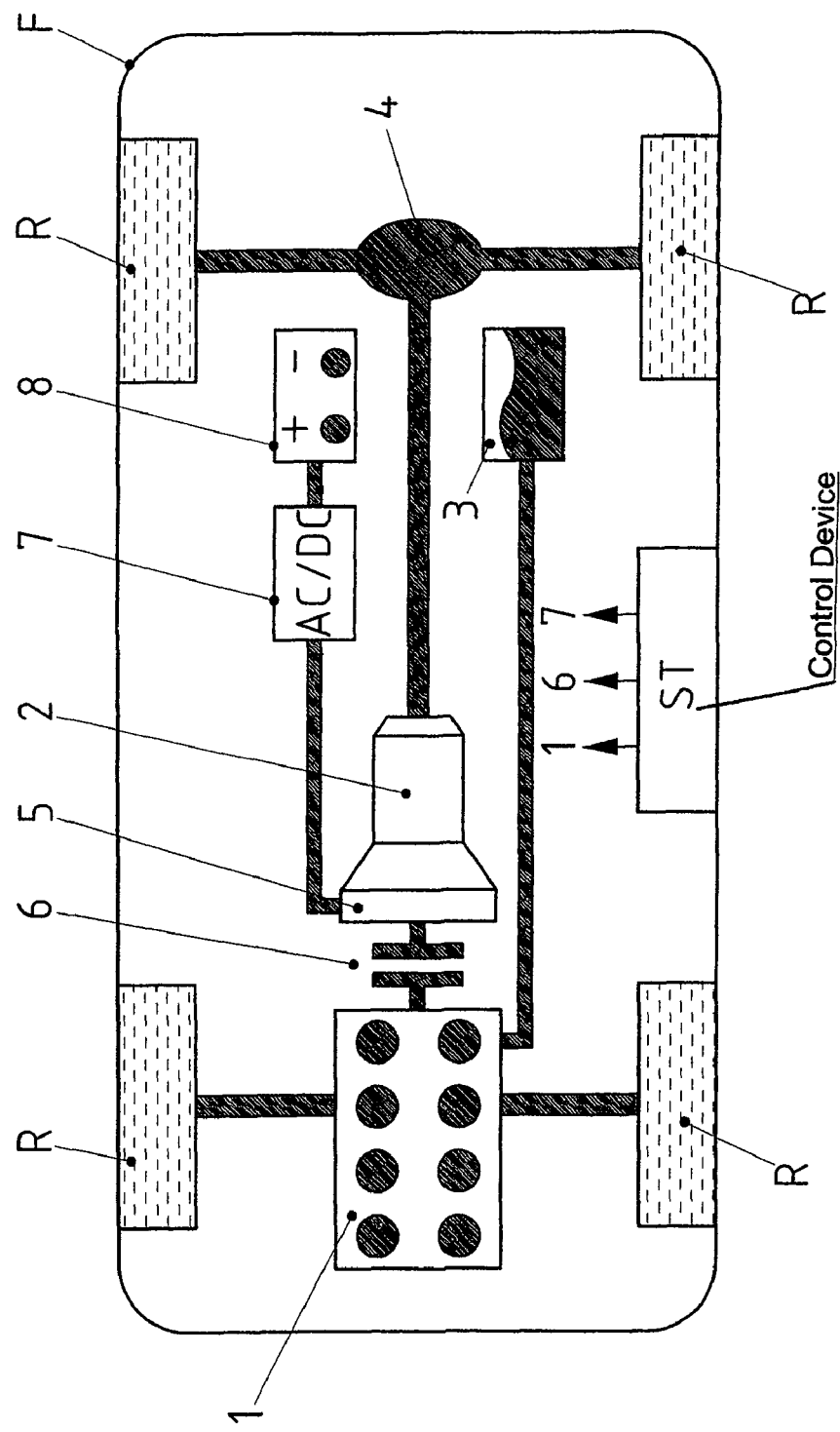
FIG. 1 is a block diagram of a hybrid vehicle drive to which the present invention can be applied.

In the figures, the same reference symbols designate identical or functionally identical elements. Referring now to the figures of the drawing in detail and first, particularly, to FIG. 1 thereof, there is shown a block diagram of a hybrid vehicle drive to which the present invention can be applied.

In FIG. 1, the reference symbol F designates a parallel hybrid vehicle drive whose drive train which acts on wheels R is composed of an internal combustion engine 1, a clutch 6, an electric motor 5, a transmission 2 and a differential 4. A fuel tank 3 stores fuel as an energy carrier for the internal combustion engine 1. A high performance battery 8 stores electrical energy for the electric motor 5. A conversion control device 7 is connected between the high performance battery 8 and the electric motor 5 and can operate bidirectionally, namely can feed electrical energy from the high performance battery 8 to the electric motor 5 in an electric drive mode, and can convert oscillating current energy supplied by the electric motor 5 into a direct current in a recovery mode, and can thus charge the high performance battery 8.

The hybrid vehicle drive F according to FIG. 1 has the now described modes. First, a conventional internal combustion engine mode without activation of the electric drive. Second, an electric drive mode without activation of the conventional internal combustion engine drive. Third, a boosting mode in which the internal combustion engine drive is supported by the electric drive. Fourth, a recovery mode in which the kinetic energy of the vehicle is recovered as electrical energy for the high performance battery 8 and the clutch 6 is opened. Fifth, a load point raising mode in which the internal combustion engine 1 supplies part of its torque to the drive and supplies a remaining part as generator torque for the electric motor 5 in order to generate electrical energy for the high performance battery 8 by the electric motor 5 and to store it in the high performance battery 8.

A control device which is designated by reference symbol ST in FIG. 1 controls the load point of the internal combustion engine 1, the position of the clutch 6 and the conversion control device 7 in dependence on the driving mode situation.

In order to reach an optimum setting of the hybrid vehicle drive F for the respective operating situation, operating situation parameters such as, for example, rotational speed, velocity, degree of activation of the accelerator pedal, engine load . . . are fed to the control device ST via non-illustrated detection devices, and on the basis of the parameters the control device ST calculates the respective optimum operating setting by predefined control algorithms and actuates the internal combustion engine 1, the clutch 6 and the conversion control device 7 correspondingly.

Figure 2:
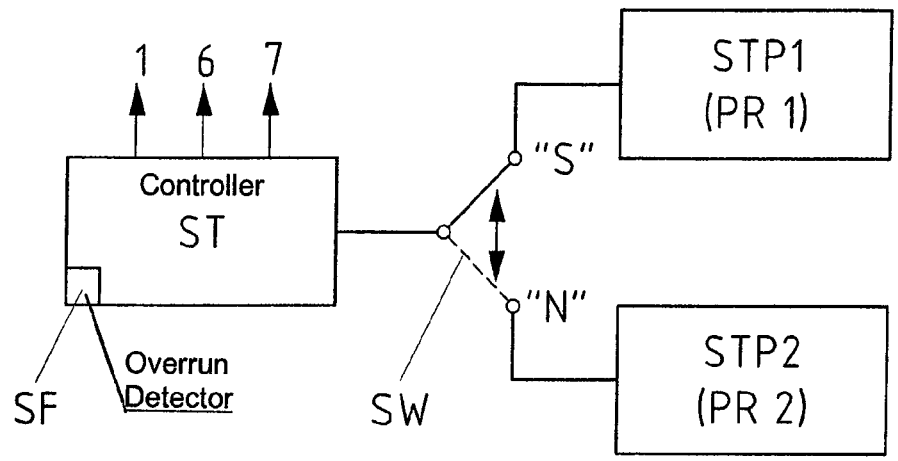
FIG. 2 is a block diagram of a first embodiment of a device according to the invention for controlling the hybrid vehicle drive.

FIG. 2 shows a block diagram of a first embodiment of a device according to the invention for controlling a hybrid vehicle drive.

With reference to FIG. 2, an overrun phase detection device SF which is predefined in the control device ST and by which the presence of an overrun phase in the vehicle can be determined is additionally illustrated. STP1 and STP2 designate control parameter sets which are stored in a non-illustrated memory device or can be calculated by the processor of the control device ST, for the overrun phase of the vehicle using a recovery torque PR1 and PR2 associated therewith, for example PR1=1 Nm, PR2=0.1 Nm. The occurrence of the recovery torques is brought about by setting a corresponding operating state of the conversion control device 7 by the control device ST. Here, the position of an intermediately connected switching device SW determines which control parameter set STP1 or STP2 uses the control device to set the recovery torque PR1 and PR2 when an overrun phase occurs, the switching device SW being in this embodiment a switch which can be operated manually by the driver.

The switching device SW has the switch positions "S" for sport mode and "N" for normal mode. If the switching device SW is in the switch position "S" shown in FIG. 2, the control parameter set STP1 in the overrun phase is selected and accordingly the recovery torque PR1=1 Nm. If, on the other hand, the switching device SW is in the switch position "N", the control parameter set STP2 in the overrun phase is selected, wherein the recovery torque PR2=0.1 Nm.

The switching device SW thus permits the driver to select different driving strategies, specifically a driving-power-optimized strategy in switch position "S" and a strategy which is optimized in terms of consumption in switch position "N", since by the switch positions it is possible to vary the recovery torque by a factor of 10.

In the strategy in switch position "N", which strategy is optimized in terms of fuel consumption, the recovery torque in overrun mode is reduced to a minimum, so that the vehicle decelerates only to a very small degree when coasting and thus the switch-on frequency of the internal combustion engine is reduced.

In the driving-power-optimized strategy, the hybrid vehicle is to decelerate severely in overrun phases, as is desired by a sports vehicle. The severe deceleration in the overrun mode allows a large amount of energy to be recovered by the electric motor 5, which energy is then available again for boosting in acceleration phases.

The driver will expediently select the switch position "N" in urban mode, while in country road mode or highway mode he will select the switch position "S".

Figure 3:
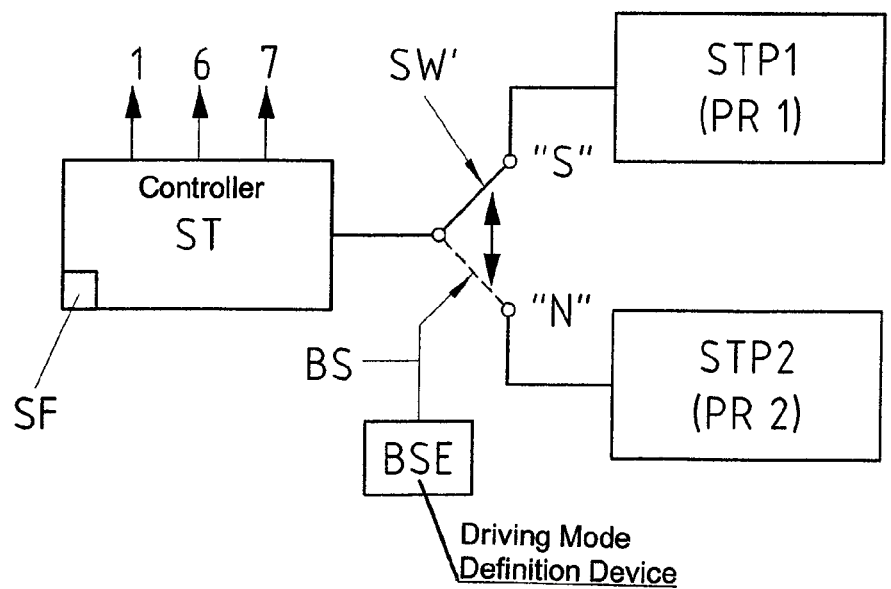
FIG. 3 is a block diagram of a second embodiment of the device according to the invention for controlling a hybrid vehicle drive.

FIG. 3 shows a block diagram of a second embodiment of a device according to the invention for controlling a hybrid vehicle drive.

In the second embodiment shown in FIG. 3, the operating strategy is not determined manually by the driver but rather automatically by a driving mode definition device BSE. The driving mode definition device BSE can determine, for example as a function of the time profile of the degree of activation of the accelerator pedal, whether the sport mode "S" or the normal mode "N" is expedient. The driving mode definition device BSE then applies a corresponding switch control signal BS to the electrically switchable switching device SW'.

Even though the present invention has been described above with reference to preferred exemplary embodiments, it is not restricted thereto but rather can be modified in a variety of ways.

Even though, in the embodiments described above, a distinction has been made between the normal and the sport operating modes for the definition of the recovery torque in overrun mode, it is of course possible to define further modes with corresponding recovery torques. Furthermore, instead of the permanently predefined recovery torques, recovery torques which can be adjusted externally by the driver or a service workshop and whose value is derived, for example, from the driving style of the driver, could be assigned to the different modes. Finally, different and/or further driving mode parameters or indicators may influence the selection of the respective modes, such as for example speed etc.

Even though a manual or controllable switching device has been used to select the control parameters set in the embodiments described above, other forms of implementation, for example different addressing of the memory device in order to store the control parameter sets, can also be imagined.

The specified recovery torques are also only exemplary and can vary greatly depending on the vehicle.

The invention claimed is:

1. A method for controlling a hybrid vehicle drive with an internal combustion engine and an electric motor, which comprises the steps of:
    specifying a multiplicity of control parameter sets with different recovery torques for a conversion control device for setting a recovery torque of the electric motor in an overrun phase;
    assigning a respective driving mode indicator to the multiplicity of control parameter sets;
    defining a current driving mode indicator manually via a driver using a switching device having only two switching positions and being actuable at any time, the switching device defining only two switch positions "S" for a sport mode and "N" for a normal mode, the switching device permitting the driver to select between two driving strategies including a driving-power-optimized strategy defined by the switch position "S" and a strategy which is optimized in terms of fuel consumption defined by the switch position "N", the switching device being separate from and independent from a gearshift lever of the automobile;
    using a respective control parameter set, corresponding to the current driving mode indicator, to control the conversion control device in the overrun phase of the hybrid vehicle drive;
    assigning a first driving mode indicator to a first control parameter set in the sport mode with a first recovery torque; and
    assigning a second driving mode indicator to a second control parameter set in the normal mode with a second recovery torque, and the first recovery torque is greater than the second recovery torque.

2. A device for controlling a hybrid vehicle drive with an internal combustion engine and an electric motor, the device comprising:
    a memory storing a multiplicity of control parameter sets with different recovery torques for a conversion control device for setting a recovery torque of the electric motor in an overrun phase, the recovery torques being assigned to a respective driving mode indicator; and
    a definition device for defining a current driving mode indicator, by which a control parameter set corresponding to the current driving mode indicator is used to control the conversion control device in an overrun phase of the hybrid vehicle drive, said definition device having a switching device being operated manually via a driver for defining the current driving mode indicator, said switching device defining only two switch positions "S" for a sport mode and "N" for a normal mode and being actuable at any time, said switching device permitting the driver to select between two driving strategies including a driving-power-optimized strategy defined by the switch position "S" and a strategy which is optimized in terms of fuel consumption defined by the switch position "N", said definition device assigning a first driving mode indicator to a first control parameter set in the sport mode with a first recovery torque, and said definition device assigning a second driving mode indicator to a second control parameter set in the normal mode with a second recovery torque, and the first recovery torque is greater than the second recovery torque, said switching device being separate from and independent from a gearshift lever of the automobile.

* * * * *